April 1, 1969     B. MAZELSKY     3,436,057

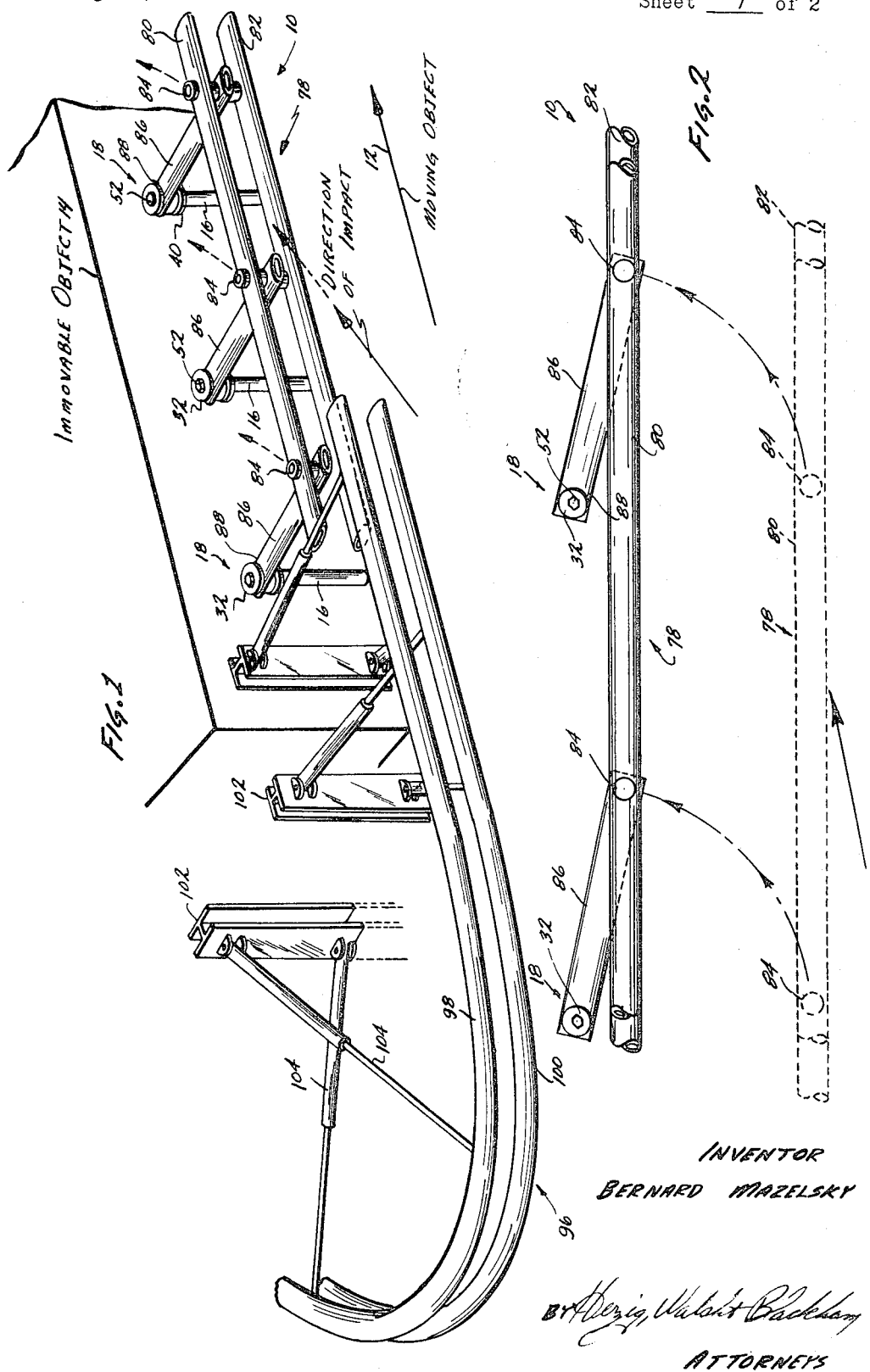

ENERGY-ABSORBING BARRIER DEVICE

Filed Aug. 10, 1967

INVENTOR
BERNARD MAZELSKY

ATTORNEYS

United States Patent Office 3,436,057
Patented Apr. 1, 1969

3,436,057
ENERGY-ABSORBING BARRIER DEVICE
Bernard Mazelsky, 2106 Dancove Drive,
West Covina, Calif. 91790
Filed Aug. 10, 1967, Ser. No. 659,758
Int. Cl. E01f 15/00; A01k 3/00; F16d 63/00
U.S. Cl. 256—13.1                              8 Claims

ABSTRACT OF THE DISCLOSURE

A highway barrier includes rotary shock attenuators which are connected to a guardrail by radial arms. These arms are swing to actuate the attenuators when the guardrail is subjected to an oblique impact. The attenuators absorb energy by rolling tubes about their own axes. The tubes are partially flattened sufficiently to radially bend and stress different portions of the material thereof beyond their elastic limits, in tension and compression.

CROSS-REFERENCE TO RELATED APPLICATION

The disclosure of copending application, Ser. No. 558,317, filed June 17, 1966, is incorporated herein by reference.

BACKGROUND OF THE INVENTION

The background of the invention will be set forth in two parts.

Field of the invention

The invention pertains generally to the field of barrier devices for preventing moving objects from impacting immovable objects and more particularly to such a device which incorporates non-destructive energy absorbing apparatus therein, whereby the barrier device may be restored to its original condition after each impact.

Description of the prior art

Copending application No. 558,317 discloses a highway barrier which includes non-destructive absorbing means with primarily arrest motion in a linear direction.

SUMMARY OF THE INVENTION

The barrier device of the present invention, on the other hand, employs an energy absorbing apparatus which will absorb energy when the barrier is subjected to an impact which results in motion of the barrier that causes a rotary action of the energy absorbing apparatus.

Accordingly, it is the primary object of the present invention to provide a new and useful energy absorbing barrier device for preventing moving objects from impacting immovable objects.

Another object of the present invention is to provide a barrier device of the type described which includes a rotary-type energy absorber for absorbing energy when the barrier is subjected to oblique impacts.

A further object of the present invention is to provide a new and useful barrier device of the type described which includes guardrail means, a rotary-type shock absorber which may be reused and a radial arm connecting the shock absorber to the guardrail.

According to the present invention, a rotary shock attenuator of the type which absorbs energy by causing tubular working elements to roll about their own tube axes to cyclically stress each portion of the material thereof in compression and tension, alternately, beyond its elastic limit, is connected to a guardrail by a radial arm.

One such shock attenuator may be affixed to each of a series of fixed support means mounted between an immovable object and the path traveled by a moving object. Each shock attenuator includes inner drum means and outer drum means encompassing the inner drum means in spaced relationship, whereby an annular chamber is formed between the drum means. Tubular working elements are mounted in this chamber and the diameter of the working elements is greater than the distance between the drum means, whereby the working elements are flattened sufficiently to radially bend and stress different portions of the material thereof beyond their elastic limits, in tension and compression.

The inner drum means is connected to the fixed support means by a circular flange which is secured to the inner drum means. This circular flange is provided with a plurality of bolt holes, two of which are adapted to be aligned with mating bolt holes provided on a circular flange affixed to the fixed support means. The bolt hole pattern in the flange on the fixed support means is such that the shock attenuator may be connected thereto in 1° increments of angular displacement so that the radial arm may be restored substantially to its original position before an impact without cycling the shock attenuator back through its energy absorbing cycle.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIGURE 1 is a perspective view of a barrier device constituting a presently preferred embodiment of the present invention;

FIGURE 2 is a partial plan view of the device of FIGURE 1 showing the relative positions of certain portions thereof before and after they have been impacted by a moving object;

DESCRIPTION OF THE PREFERRED EMBODIMENT

Referring again to the drawings and more particularly to FIGURES 1 and 2, an energy absorbing barrier device, generally designated 10, is adapted to prevent moving objects (represented diagrammatically by arrow 12) from impacting immovable objects (represented diagrammatically at 14).

Figure 3:
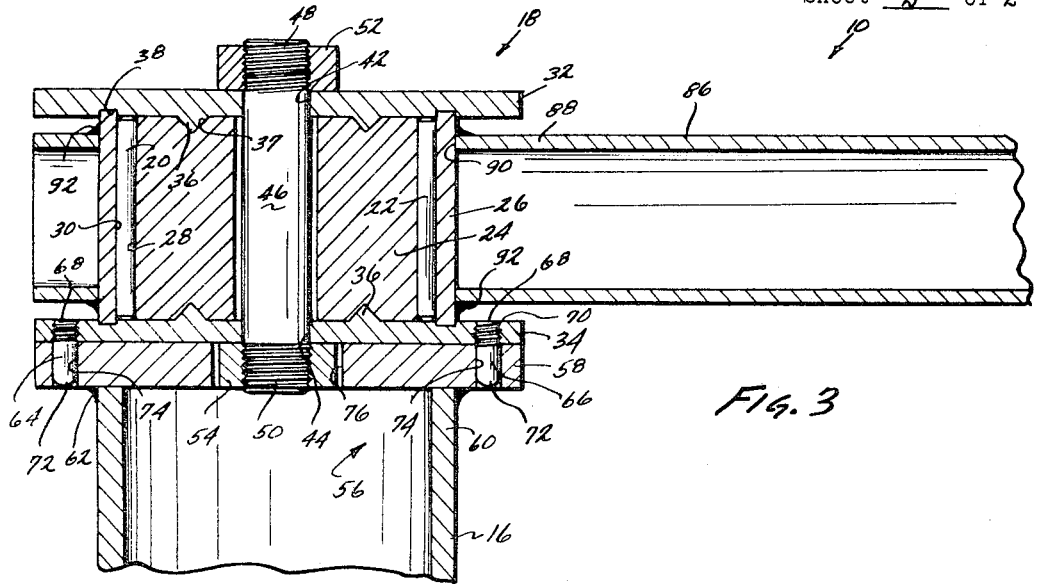
FIGURE 3 is an enlarged, partial cross-sectional view of one of the rotary energy absorbers, and its related elements, shown in FIGURE 1.

The barrier device 10 includes a fixed support means 16 mounted between the immovable object 14 and the path traveled by the moving object 12. An energy attenuator means 18, which is preferably of one of the types shown in U.S. Patent No. 3,301,351 and which is shown herein for purposes of illustration, but not of limitation, as being most nearly like the one shown and described in connection with FIGURE 8 of said patent, is carried by the support means 16. The attenuator means 18 may be made in accordance with the teachings of said Patent No. 3,301,351 from any of the materials therein specified and includes a plurality of tubular working elements, like the ones shown at 20, 22 in FIGURE 3. The attenuator means 18 also includes a pair of opposed members 24, 26, which will sometimes be referred to herein as "an inner drum means" and "an outer drum means," respectively.

The members 24, 26 have opposed surfaces 28, 30, respectively, frictionally engaging the periphery of each working element 20, 22.

The attenuator means 18 also includes means for holding the opposed members 24, 26 so spaced that they partially flatten the tubular working elements 20, 22 sufficiently to radially bend and stress different portions of the material thereof beyond their elastic limits, in tension and compression. These holding means are shown herein for purposes of illustration, but not of limitation, as comprising first and second circular plates 32, 34, respectively, which are located with respect to the inner drum means 24 by an annular ridge 36 on each plate and an annular groove 37 on each end of the inner drum means. The plates 32, 34 are provided with annular grooves 38, 40, respectively, which cage the outer drum means 26 while leaving it free to rotate with respect to plates 32, 34. The plates 32, 34 are also provided with central apertures 42, 44 respectively, which receive a bolt 46 having externally threaded ends 48, 50 threadedly engaged by nuts 52, 54 respectively, for insuring that the plates and drums will be maintained in assembled relationship.

Figure 4:
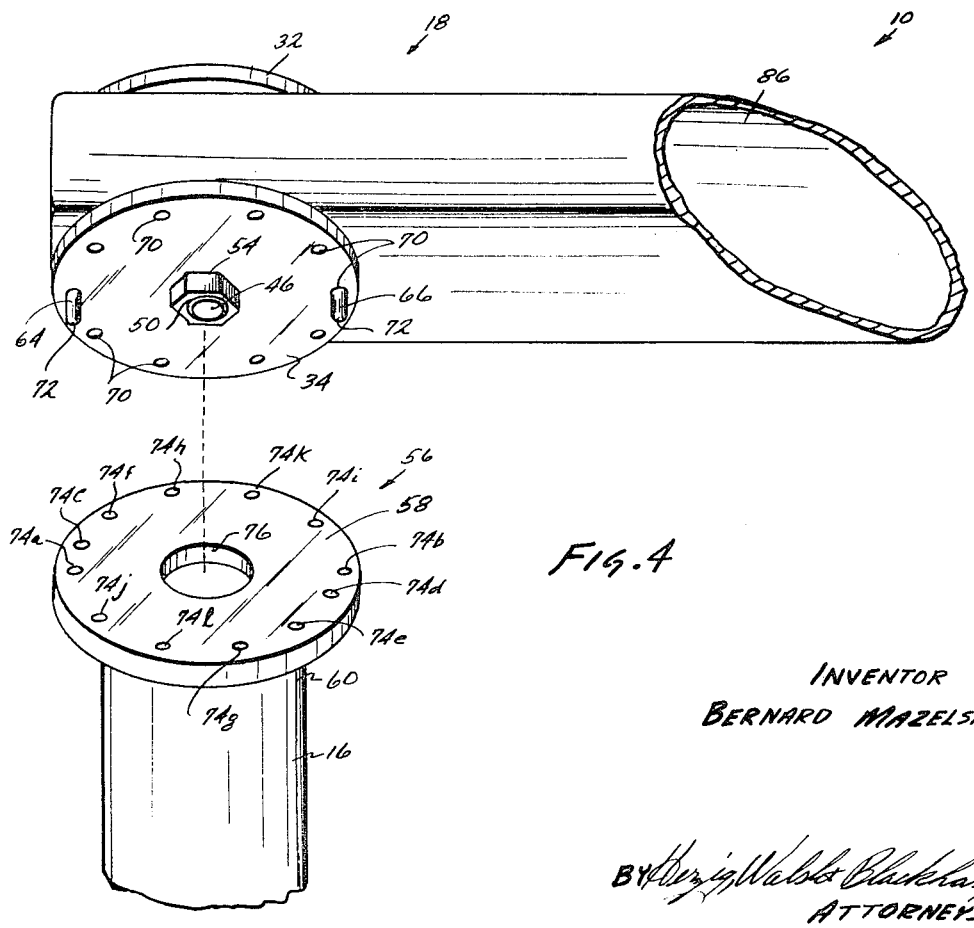
FIGURE 4 is a reduced, exploded perspective view of a portion of the device shown in FIGURE 3.

The device 10 also includes a first connecting means 56 immovably connecting the inner drum means 24 to the fixed support means 16. The first connecting means 56 includes a circular plate 58 secured to one end 60 of support means 16 by suitable weldments, as indicated at 62, and a pair of dowel pins 64, 66. The dowel pins 64, 66 each includes an externally threaded end 68 adapted to threadedly engage one of a plurality of internally threaded apertures 70 provided in plate 34 and an unthreaded end 72 adapted to be engaged in one of a plurality of apertures 74 provided in plate 58. The apertures 70 are spaced 36° apart on plate 34 and the pins 64, 66 are preferably spaced 180° apart. Apertures 74 have a different pattern wherein apertures 74a and 74b are 180° apart. Aperture 74c is 18° clockwise (as viewed in FIGURE 4) from aperture 74a and aperture 74d is 18° clockwise from aperture 74b; apertures 74e and 74f are 35° clockwise from apertures 74b and 74a, respectively; apertures 74g and 74h are 74.25° clockwise from apertures 74b and 74a, respectively; apertures 74i and 74j are 40.5° counterclockwise from apertures 74b and 74a, respectively; and apertures 74k and 74l are 73.125° counterclockwise from apertures 74b and 74a, respectively. With this aperture pattern in plate 58 and with pins 64, 66 spaced 180° apart, the pins 64, 66 will each engage an aperture 74 in plate 58 within one degree of accuracy regardless of the amount of rotation of the plate 34 with respect to the plate 58. The plate 58 is also provided with an aperture 76 for receiving the nut 54 without restraining it against rotation.

The device 10 also includes a guard rail means 78 including a first guard rail member 80 and a second guard rail member 82 which are preferably given elliptical cross sections for added strength and which are connected together by a plurality of hollow, tubular members 84. Each member 84 is connected to an associated attenuator 18 by an arm 86 having an end 88 provided with an aperture 90 receiving the outer drum means 26. Each arm 86 may be rigidly affixed to an associated drum means 26 by weldments 92 and may have an elliptical cross section, as shown. Each arm 86 comprises a second connecting means connecting an associated outer drum means 26 to guard rail means 78 in such a manner that an oblique impact on the guard rail means 78 by the moving object 12 will move the drum means 26 angularly with respect to the inner drum means 24 causing the working elements 20, 22 to roll about their tube axes and thereby to cyclically stress each portion of the material thereof in compression and tension, alternately, beyond its elastic limit, whereby plastic deformation thereof absorbs the energy imparted to the outer drum means 26 by its associated arm 86 through guardrail means 78 and moving object 12 to rotate outer drum 26. This results in an angular displacement of each arm 86 causing the guard rail means 78 to move from the position shown in broken lines in FIGURE 2 to the solid line position shown therein.

Since the working elements 20, 22 absorb energy without becoming destroyed, the barrier device 10 may be restored to its FIGURE 1 position after each impact. This could be accomplished by swinging the arms 86 back to their FIGURE 1 positions against the resistance offered by working elements 20, 22; however, this would require a substantial amount of energy. On the other hand, the energy absorbing device 10 may be restored to its FIGURE 1 condition using a minimum amount of energy by lifting each attenuator 18 from its associated plate 56. Each arm 86 may then be swung to its FIGURE 1 position and the pins 64, 66 may be seated in appropriate apertures 74 so that the arm 86 will be within at least 1° of its former position.

Referring again to FIGURE 1, the device 10 is designed primarily to receive oblique impacts from moving object 12 while head-on impacts are received by another barrier device 96 having a pair of elliptical guardrails 98, 100 connected to fixed support means 102 by energy absorbing devices 104 of the type disclosed in said copending application Ser. No. 588,317.

While the particular barrier device herein shown and described in detail is fully capable of attaining the objects and providing the advantages hereinbefore started, it is to be understood that it is merely illustrative of the presently preferred embodiment of the invention and that no limitations are intended to the details or construction or design herein shown other than as defined in the appended claims which form a part of this disclosure.

What is claimed is:

1. An energy-absorbing barrier device for preventing moving objects from impacting immovable objects, comprising:
    (a) fixed support means mounted between said immovable object and the path traveled by said moving object;
    (b) energy attenuator means carried by said support means, said attenuator means including:
        (i) at least one tubular working element;
        (ii) opposed members having opposed surfaces frictionally engaging the periphery of said working element; and
        (iii) means holding said opposed members so spaced that they partially flatten said tubular working element sufficient to radially bend and stress different portions of the material thereof beyond their elastic limits, in tension and compression;
    (c) first connecting means immovably connecting one of said opposed members to said fixed support means for preventing movement of said one opposed member with respect to said fixed support means;
    (d) guard rail means; and
    (e) second connecting means connecting another of said opposed members to said guard rail means in such a manner that an oblique impact on said guardrail means by said object will move said another member with respect to said one opposed member causing said working element to roll about its tube axis and thereby to cyclically stress each portion of the material thereof in compression and tension, alternately, beyond its elastic limit, whereby elastic deformation thereof absorbs the energy imparted to said another opposed member by said guardrail means to move said another opposed member.

2. A barrier device as stated in claim 1 wherein said opposed members comprise an inner drum means, an outer drum means encompassing said inner drum means in spaced relationship therewith, whereby an annular chamber is formed between said drum means, the outer peripheral surface of said inner drum means and the inner peripheral surface of said outer drum means comprising said opposed surfaces and wherein said holding means comprises a circular plate affixed to each end of said inner drum means, said circular plates being provided with annular grooves rotatably receiving said outer drum means.

3. A barrier device as stated in claim 2 wherein said first connecting means includes a plate means affixed to said support means and being provided with a plurality of apertures and pin means extending from one of said plates on said inner drum means into engagement with at least one aperture in said plate means on said support means.

4. A barrier device as stated in claim 2 wherein said working element comprises a plurality of tubular members.

5. A barrier device as stated in claim 2 wherein said guard rail means comprises a pair of rail members having elliptical cross section.

6. A barrier device as stated in claim 5 wherein said second connecting means includes a tubular member connecting said guard rails together and a radial arm connecting said guard rail tubular member to said outer drum means.

7. A barrier device as stated in claim 6 wherein said apertures in said support means plate means are spaced on 18, 40.5, 45, 73.125 and 74.25 degree centers, respectively.

8. A barrier device as stated in claim 7 wherein said pin means comprises a pair of pins affixed to said circular plate 180° apart.

References Cited

UNITED STATES PATENTS

| | | | |
|---|---|---|---|
| 1,718,875 | 6/1929 | Ramsey | 256—13.1 |
| 2,025,013 | 12/1935 | Brickman et al. | 256—13.1 |
| 2,890,076 | 6/1959 | Baechler | 293—90 |
| 3,385,564 | 5/1968 | Persicke | 256—13.1 |

DAVID J. WILLIAMOWSKY, *Primary Examiner.*

D. L. TAYLOR, *Assistant Examiner.*

U.S. Cl. X.R.

188—1

UNITED STATES PATENT OFFICE
CERTIFICATE OF CORRECTION

Patent No. 3,436,057                Dated     April 1, 1969

Inventor(s)     Bernard Mazelsky

It is certified that error appears in the above-identified patent and that said Letters Patent are hereby corrected as shown below:

In the heading to the printed specification, lines 3 and 4, "Bernard Mazelsky, 2106 Dancove Drive, West Covina, Calif. 91790" should read -- Bernard Mazelsky, West Covina, Calif., assignor to ARA, Inc. (Aerospace Research Associates), West Covina, Calif., a corporation of California --.

Signed and sealed this 16th day of March 1971.

(SEAL)
Attest:

EDWARD M. FLETCHER, JR.                WILLIAM E. SCHUYLER, JR.
Attesting Officer                         Commissioner of Patents